(12) United States Patent
Lammens et al.

(10) Patent No.: US 10,478,796 B2
(45) Date of Patent: Nov. 19, 2019

(54) CONTROL OF FOULING IN HIGH PRESSURE POLYETHYLENE MANUFACTURE

(71) Applicant: ExxonMobil Chemical Patents Inc., Baytown, TX (US)

(72) Inventors: Henri A. Lammens, Antwerp (BE); Paul J. Clymans, Kapelle-Op-Den-Bos (BE); Philip H. Cornelissen, Heverlee (BE)

(73) Assignee: ExxonMobil Chemical Patents Inc., Baytown, TX (US)

( * ) Notice: Subject to any disclaimer, the term of this patent is extended or adjusted under 35 U.S.C. 154(b) by 115 days.

(21) Appl. No.: 15/573,974

(22) PCT Filed: May 13, 2016

(86) PCT No.: PCT/US2016/032371
§ 371 (c)(1),
(2) Date: Nov. 14, 2017

(87) PCT Pub. No.: WO2017/003566
PCT Pub. Date: Jan. 5, 2017

(65) Prior Publication Data
US 2018/0290120 A1    Oct. 11, 2018

Related U.S. Application Data

(60) Provisional application No. 62/186,914, filed on Jun. 30, 2015.

(30) Foreign Application Priority Data

Aug. 7, 2015    (EP) .................................... 15180118

(51) Int. Cl.
*B01J 19/00* (2006.01)
*B01J 4/00* (2006.01)
(Continued)

(52) U.S. Cl.
CPC ............. *B01J 19/002* (2013.01); *B01J 4/008* (2013.01); *B01J 19/0013* (2013.01); *B01J 19/06* (2013.01);
(Continued)

(58) Field of Classification Search
USPC ........................................... 526/64; 422/134
See application file for complete search history.

(56) References Cited

U.S. PATENT DOCUMENTS 7,563,413 B2 * 7/2009 Naets ...................... F04B 41/06
422/131
2003/0008982 A1    1/2003 Mahling et al.
(Continued)

FOREIGN PATENT DOCUMENTS

EP              0144716 A      6/1985

*Primary Examiner* — Fred M Teskin
(74) *Attorney, Agent, or Firm* — Leandro Arechederra, III; Kristina M. Okafor (57) ABSTRACT

Systems and processes for controlling fouling in the manufacture of ethylene polymers and copolymers at high pressure. Disclosed is a high pressure polyethylene polymerization system comprising a reactor, a primary compressor, and a secondary compressor, the secondary compressor comprising: a) a first stage, wherein the first stage comprises at least two cylinders, and the discharge pipes of the at least two cylinders are fluidly connected by a first stage discharge cross-connect pipe; b) a second stage; c) an interstage; and d) a first cooler applied to the interstage piping starting at a location within 10 meters downstream of the first stage discharge cross-connect pipe.

25 Claims, 3 Drawing Sheets

(51) Int. Cl.
*C08F 110/02* (2006.01)
*B01J 19/06* (2006.01)
*C08F 2/38* (2006.01)

(52) U.S. Cl.
CPC ... *C08F 110/02* (2013.01); *B01J 2219/00094* (2013.01); *B01J 2219/00159* (2013.01); *B01J 2219/00162* (2013.01); *B01J 2219/00247* (2013.01)

(56) References Cited

U.S. PATENT DOCUMENTS

| | | | |
|---|---|---|---|
| 2005/0192414 A1* | 9/2005 | Donck | B01J 19/2415 526/64 |
| 2007/0032614 A1 | 2/2007 | Goossens et al. | |

* cited by examiner

CONTROL OF FOULING IN HIGH PRESSURE POLYETHYLENE MANUFACTURE

CROSS-REFERENCE OF RELATED APPLICATIONS

This application is a National Phase Application of International Application Serial No. PCT/US2016/032371, filed May 13, 2016, and claims the benefit of Ser. No. 62/186,914, filed Jun. 30, 2015 and EP Application No. 15180118.0, filed Aug. 7, 2015, the disclosures of which are fully incorporated by reference in their entireties.

FIELD OF THE INVENTION

This invention relates to systems and processes for controlling fouling in the manufacture of ethylene polymers and copolymers at high pressure.

BACKGROUND OF THE INVENTION

High pressure reactor polymerization plants convert relatively low cost olefin monomers (generally ethylene, optionally in combination with one or more comonomers such as vinyl acetate) into valuable polyolefin products. Such processes using oxygen or organic free-radical initiators, in particular peroxide initiators, are known in the art and have been used in industry for a long time. The polymerization takes place at relatively high temperatures and pressures and is highly exothermic. The resulting polymer is a low density polyethylene (LDPE), optionally containing comonomers.

High pressure polymerization processes are carried out in autoclave or tubular reactors. In principle, the autoclave and the tubular polymerization processes are very similar, except for the design of the reactor itself. The plants generally use two main compressors arranged in series, each with multiple stages, to compress the monomer feed. A primary compressor provides an initial compression of the monomer feed, and a secondary compressor increases the pressure generated by the primary compressor to the level at which polymerization takes place in the reactor, which is typically about 210 to about 320 MPa for a tubular reactor and about 120 to about 200 MPa for an autoclave reactor.

The interstage pressure of the secondary compressor is high enough to result in thermal polymerization, which causes a high density, high molecular weight fouling layer of polymer to form on the inner surfaces of the compressor piping. Thermal polymerization is initiated by the presence of radicals and progresses at a higher rate when temperatures are higher and more radicals are present. Fouling can lead to a complete plugging of gas flow lines in the remainder of the process and unfavorably high pressure drop, which can lead to reduced compressor throughput, poor pumping efficiency, and damage in the secondary compressor. Fouling also increases the risk of decompositions reactions, which occur when active radicals are trapped in the polymer layer.

Removal of the fouling layer requires the use of either mechanical or chemical cleaning. Typically, a shutdown of more than twenty hours is required. Additionally, there is a risk that portions of the polymer layer may come loose, especially during start up, and form plugs in the system, requiring dismantling of the piping for complete removal.

Background references include US 2003/008982, US 2007/032614, and EP 0 144 716 A.

There is a need for a processes and systems for producing low density polyethylene that overcome the possibility for premature polymerization and fouling in the compressor, without significantly changing compressor operating conditions or requiring equipment to be shut down regularly for cleaning. There is also a need for piping designs that allow piping to be easily and quickly dismantled for cleaning to minimize shut down and downtime costs.

SUMMARY OF THE INVENTION

The present invention relates to a high pressure polyethylene polymerization system comprising a reactor, a primary compressor, and a secondary compressor, the secondary compressor comprising: a) a first stage, wherein the first stage comprises at least two cylinders, and the discharge pipes of the at least two cylinders are fluidly connected by a first stage discharge cross-connect pipe; b) a second stage; c) an interstage; and d) a first cooler applied to the interstage piping starting at a location within 10 meters downstream of the first stage discharge cross-connect pipe.

The present invention also relates to a high pressure polyethylene polymerization process comprising: a) providing a feed stream comprising ethylene; b) compressing the feed stream in a primary compressor; c) further compressing the feed stream in a secondary compressor, wherein the secondary compressor comprises a first stage and a second stage, and wherein the first stage comprises at least two cylinders, and the discharge pipes of the at least two cylinders are fluidly connected by a first stage discharge cross-connect pipe; d) cooling the compressed feed stream at a location within 10 meters downstream of the first stage discharge pipe cross-connect; and e) feeding the compressed feed stream to a polymerization reactor.

Systems and processes according to the present invention enable high pressure polymerization processes to operate without the risk of thermal polymerization fouling.

DETAILED DESCRIPTION OF THE INVENTION

The present invention relates to a high pressure polyethylene polymerization system comprising a reactor, a primary compressor, and a secondary compressor, the secondary compressor comprising: a) a first stage, wherein the first stage comprises at least two cylinders, and the discharge pipes of the at least two cylinders are fluidly connected by a first stage discharge cross-connect pipe; b) a second stage; c) an interstage; and d) a first cooler applied to the interstage piping starting at a location within 10 meters downstream of the first stage discharge cross-connect pipe.

The present invention also relates to a high pressure polyethylene polymerization process comprising: a) providing a feed stream comprising ethylene; b) compressing the feed stream in a primary compressor; c) further compressing the feed stream in a secondary compressor, wherein the secondary compressor comprises a first stage and a second stage, and wherein the first stage comprises at least two cylinders, and the discharge pipes of the at least two cylinders are fluidly connected by a first stage discharge cross-connect pipe; d) cooling the compressed feed stream at a location within 10 meters downstream of the first stage discharge pipe cross-connect; and e) feeding the compressed feed stream to a polymerization reactor.

It is generally known to add modifiers in the suction of the secondary compressor or in the primary compressor to act as chain transfer agents and thus control the molecular weight of the ethylene product. However, certain common modifiers can actually increase the rate of thermal polymerization fouling significantly. It has been discovered that the type of modifier used influences the mechanism and location of fouling within the system, and thus the methods and systems for mitigating fouling should differ depending on the modifier.

Aldehydes modifiers like propionaldehyde and acetaldehyde, for example, have high chain transfer activities and can increase the rate of intercooler fouling significantly. They interact within the system to form a short-lived radical. This can stop the chain growth that is responsible for fouling essentially immediately, but can start the formation of new chains which are generally shorter and have lower melting points. These new chains can travel into the intercoolers and cause fouling within the intercoolers, rather than upstream. Thus, with aldehyde modifiers, it is important to keep the discharge temperatures of the stages of the secondary compressor as low as possible to avoid thermal polymerization and fouling.

Saturated modifiers, such as methane, propane, butane, and others typically have lower chain transfer activities. Saturated modifiers can interact within the system to form a short-lived radical, which can again stop chain growth immediately. However, localized concentrations of saturated modifier can become too high and start to promote the formation of new shorter chains, leading to a similar fouling mechanism as for aldehydes.

When the modifier is an unsaturated modifier, the modifier interacts within the system to form a radical that may be stable. The radical formed by propylene, for example, is stable at certain temperatures and pressures. Unsaturated modifiers may not promote the formation of new chains due to the longer life of the radical, however, they also may not immediately stop the chain growth that is responsible for fouling after the process stream has left the cylinder. Thus, with this type of modifier, it is especially important to cool down the process stream immediately upon exit of the cylinders to conditions where the radical formed will not be as stable. It is also particularly important to control the concentration of modifier within the system. Areas with a lower concentration of unsaturated modifier will have higher thermal polymerization fouling rates because insufficient chain transfer agent is available to stop the chain growth. When the concentration and cooling are appropriately maintained, unsaturated modifiers will stop chain growth and not lead to thermal polymerization fouling due to their chain transfer activity.

In view of this understanding, it has been discovered that maintaining the discharge temperatures of the stages of the secondary compressor at or below certain maximum temperatures is important in mitigating thermal polymerization fouling, and that these maximum operating temperatures are a function of the particular modifiers used. Fouling rates can increase dramatically if the discharge temperatures are allowed to drift above these maximum temperatures.

Specifically, when an aldehyde is used as a modifier or in absence of any modifier, the operating discharge temperature of the first stage cylinders in the secondary compressor should be substantially maintained at less than or equal to 85° C., 84° C., 83° C., 82° C., 81° C., or 80° C. in embodiments of the invention. Likewise, the operating discharge temperature of the second and optionally any subsequent stage cylinders in the secondary compressor should be substantially maintained at less than or equal to 65° C., 64° C., 63° C., 62° C., 61° C., or 60° C. When a modifier other than an aldehyde is used, the operating discharge temperature of the first stage cylinders of the secondary compressor should be substantially maintained at less than or equal to 95° C., 94° C., 93° C., 92° C., 91° C., or 90° C. in embodiments of the invention. Likewise, the operating discharge temperature of the second and optionally any subsequent stage cylinders of the secondary compressor should be substantially maintained at less than or equal to 95° C., 94° C., 93° C., 92° C., 91° C., or 90° C. The term "operating discharge temperature" for purposes of this disclosure means the temperature of the process stream immediately upon exit of the cylinders in the given stage of the secondary compressor. The term "substantially maintained" for purposes of this disclosure means that temporary temperature excursions above the operating discharge temperature are permissible so long as the total time above the operating discharge temperature does not exceed 600 minutes, 480 minutes, 360 minutes, or preferably 240 minutes in any 24-hour period. These types of temporary temperature excursions may occur in practice, for example, when the recycle coolers are defouled, which may involve heating the recycle coolers and associated equipment to temperatures above 100° C.

As thermal polymerization rates generally increase in the presence of radicals, radical scavengers may also be used. Radical scavengers can be added to the process through the raw materials and lubrication oils. For example, in processes for making vinyl acetate-based polymers, the vinyl acetate monomer may contain a hydroquinone radical scavenger. The vinyl acetate monomer may contain between 3 and 30 ppm, between 3 and 24 ppm, between 3 and 20 ppm, between 14 and 30 ppm, or between 14 and 24 ppm of hydroquinone. In another example, butylated hydroxytoluene (2,6-di-tert-butyl-4-methylphenol or "BHT"), or other derivatives containing butylated hydroxytoluene units, may be used as a radical scavenger. The BHT may be present in the lubricating oil used on the cylinders of the secondary compressor, and forms a film on the surface of the cylinders that prevents the formation of polymer on these surfaces. The amount of BHT present in the lubricating oil typically ranges from 1000 ppm to about 6 wt %, based on the total amount of lubricating oil. Higher or lower amounts may be selected depending on, among other factors, the activity of the comonomers present in the process stream.

As thermal polymerization may also increase if the modifier concentration is too low, the concentration of modifier may be controlled in various ways to mitigate the possibility for thermal polymerization fouling. In embodiments of the invention, process streams with low concentrations of unsaturated modifier are avoided. For example, with respect to any process stream within the system or within any stage of the primary and/or secondary compressor, the concentration of unsaturated modifier may be maintained at equal to or greater than 0.1, 0.3, 0.5, 0.7, or 1.0 mol % or greater, based on the total moles of the process stream or stage. The concentration of unsaturated modifier in all of the process streams in the primary and/or secondary compressor may be maintained at equal to or greater than 0.1, 0.3, 0.5, 0.7, or 1.0 mol % or greater, based on the total moles in all of the process streams of the primary and/or secondary compressor. In an embodiment of the invention where propylene is present, the concentration of propylene is maintained at or greater than 0.1 mol %, based on the total moles in the process stream, stage, or primary and/or secondary compressor.

In an embodiment of the invention where an ethylene-vinyl acetate copolymer is produced, fresh vinyl acetate monomer may be injected into the common cylinders and interstage piping. The fresh vinyl acetate typically contains a radical scavenger, whereas recycled vinyl acetate coming in through the process recycle does not. Thus, injection of fresh vinyl acetate into the common suction enables the scavenger to be more evenly dispersed throughout the cylinders and interstage piping. Where it is desired to use a lower modifier concentration, for example, to produce a given product grade, the number of temporary temperature excursions above the maximum operating discharge temperatures may be minimized to mitigate the possibility of thermal polymerization fouling. For example, the number of recycle cooler defouls, or other events causing temperature excursions, may be minimized. Key process parameters relevant to secondary compressor fouling may be closely monitored, including but not limited to intercooler heat transfer coefficient, intercooler outlet temperatures, hyper compressor interstage pressure drop, and others.

The piping connected to the cylinders of the secondary compressor is prone to vibration. The first pipe spool is often free of fouling because the residence time in this spool is short and the vibration helps in preventing deposits. The hot piping further downstream of the pressure equalizing primary compressor, however, is more prone to thermal polymerization and thus fouling. As such, the secondary compressor interstage piping should be cooled. This cooling may be accomplished by any means known in the art, such as a cooling jacket or heat exchanger. Interstage cooling jackets may use cooling water from the reactor feed gas coolers for an autoclave process or chilled water from the side stream coolers for a tubular process, or another source of cool water.

In embodiments of the invention, it is advantageous to cool the interstage piping as soon as possible. Thus, the cooling on the discharge pipes of the first stage of the secondary compressor may start at a location that is within 10 meters downstream of the first stage discharge pipe cross-connects of the cylinders on each side of the compressor. It may end at a location that is within 10 meters upstream of the second stage suction pipe cross-connects. For example, interstage cooling jackets on the discharge pipes of the first stage of the secondary compressor may start at a location that is within 10 meters, 5 meters, 2.5 meters, 1 meter, 0.5 meters, 0.25 meters, 0.1 meters, or 0.05 meters downstream of the first stage discharge pipe cross-connects, and end at a location that is within 10 meters, 5 meters, 2.5 meters, 1 meter, 0.5 meters, 0.25 meters, 0.1 meters, or 0.05 meters upstream of the second stage suction pipe cross-connects. Additionally, interstage cooling jackets on the discharge pipes of the first stage of the secondary compressor may start at a location that is immediately downstream of the first stage discharge pipe cross-connects, and end at a location that is immediately prior to the second stage suction pipe cross-connects. Additionally or alternatively, a heat exchanger may be located at any of these locations. For purposes of this disclosure, "immediately" in this context means that the interstage cooling jacket is actually in physical contact with a surface of the pipe cross-connect at the given location, or in physical contact with a surface of the discharge valve if there is a discharge valve immediately downstream of the pipe cross-connect.

The same practice of starting cooling after the cross-connects is applied to the discharge pipes of the second stage of the secondary compressor. Thus, interstage cooling jackets on the discharge pipes of the second stage of the secondary compressor may start at a location that is within 10 meters downstream of the second stage discharge pipe cross-connects of the cylinders on each side of the compressor, and end at a location that is within 10 meters upstream of the reactor entrance. For example, interstage cooling jackets on the discharge pipes of the second stage of the secondary compressor may start at a location that is within 10 meters, 5 meters, 2.5 meters, 1 meter, 0.5 meters, 0.25 meters, 0.1 meters, or 0.05 meters downstream of the second stage discharge pipe cross-connects, and end at a location that is within 10 meters, 5 meters, 2.5 meters, 1 meter, 0.5 meters, 0.25 meters, 0.1 meters, or 0.05 meters upstream of the reactor entrance. Additionally, interstage cooling jackets on the discharge pipes of the second stage of the secondary compressor may start at a location that is immediately downstream of the second stage discharge pipe cross-connects, and end at a location that is immediately upstream to the reactor entrance. Additionally or alternatively, a heat exchanger may be located at any of these locations. Again, "immediately" in this context means that the interstage cooling jacket is actually in physical contact with a surface of the pipe cross-connect at the given location, or in physical contact with a surface of the discharge valve if there is a discharge valve immediately downstream of the pipe cross-connect.

Figure 1:
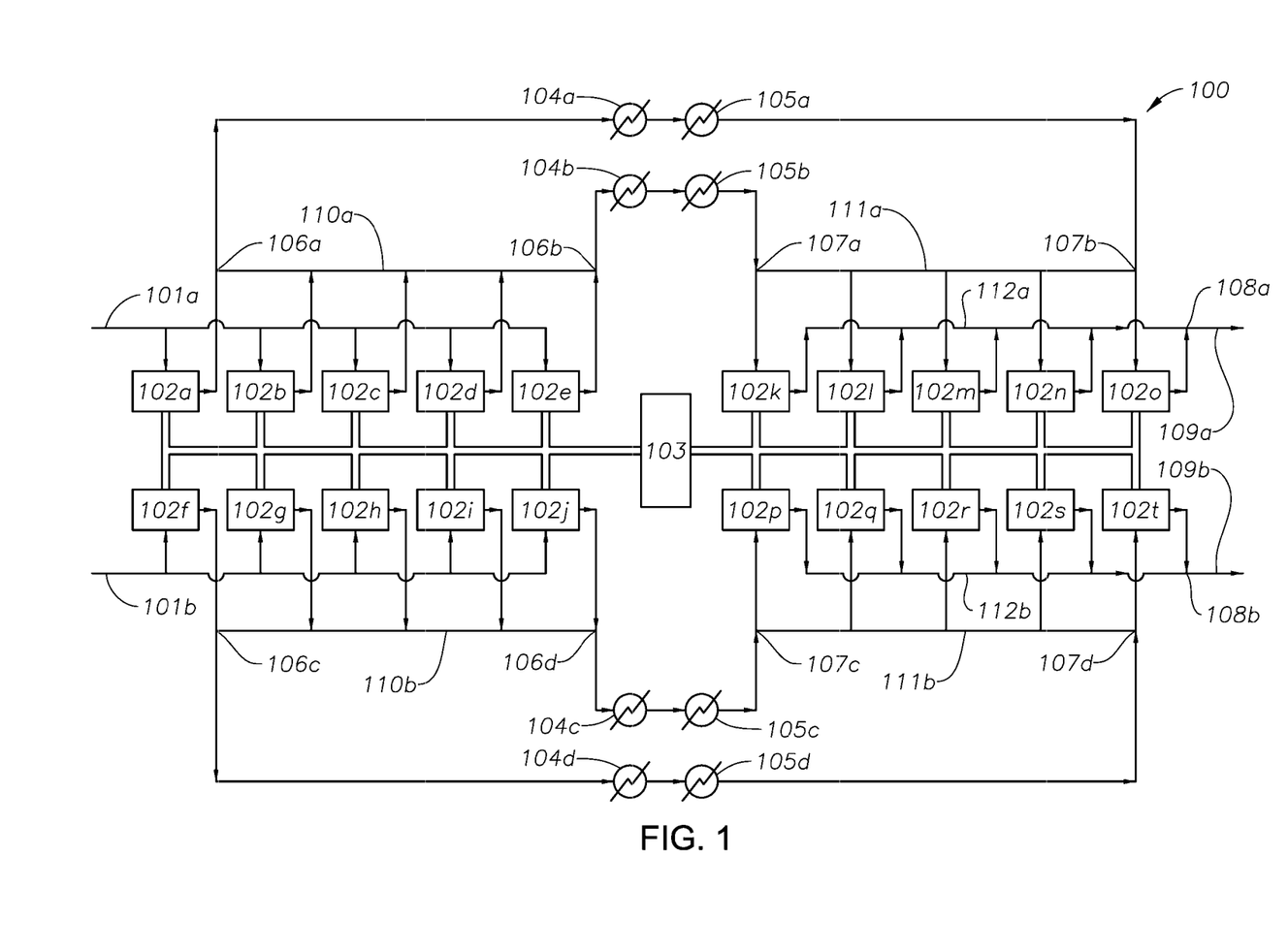
FIG. 1 shows schematically the interstage of a secondary compressor according to an embodiment of the invention.

FIG. 1 shows an exemplary two-stage secondary compressor system 100, with a schematic layout of the interstage. In the system 100 of FIG. 1, ethylene feed streams 101a and 101b enter the first stage cylinders 102a-j, driven by electric motor 103, and are compressed. Ethylene feed streams 101a and 101b may be fresh or recycled ethylene or a mix. There are four intercoolers 104a-d using cooling water and four trim intercoolers 105a-d using chilled water as the cooling medium. The compressed ethylene streams exit the first stage cylinders 102a-j, and are piped to the four intercoolers 104a-d and then to the four trim coolers 105a-d. The cooled ethylene streams exit the four trim coolers 105a-d, and are piped to the second stage cylinders 102k-t, also driven by electric motor 103, and further compressed. The further compressed ethylene streams 109a-b exit the secondary compressor system 100 and are fed to the reactor (not shown in FIG. 1).

In FIG. 1, the first stage discharge cross-connect pipes are designated as 110a-b and the first stage discharge pipe cross-connects are shown as locations 106a-d. The second stage suction cross-connect pipes are designated as 111a-b, and the second stage suction pipe cross-connects are shown as locations 107a-d. The second stage discharge cross-connect pipes are designated as 112a-b, and the second stage discharge pipe cross-connects are shown as locations 108a-b. As discussed, the interstage cooling jackets on the discharge pipes of the first stage cylinders 102a-j should start within 10 meters downstream of locations 106a-d, and end within 10 meters upstream of locations 107a-d. The interstage cooling jackets on the discharge pipes of the second stage should start within 10 meters downstream of locations 108a-b, and end within 10 meters upstream of the entrance to the reactor (not shown in FIG. 1).

Figure 2:
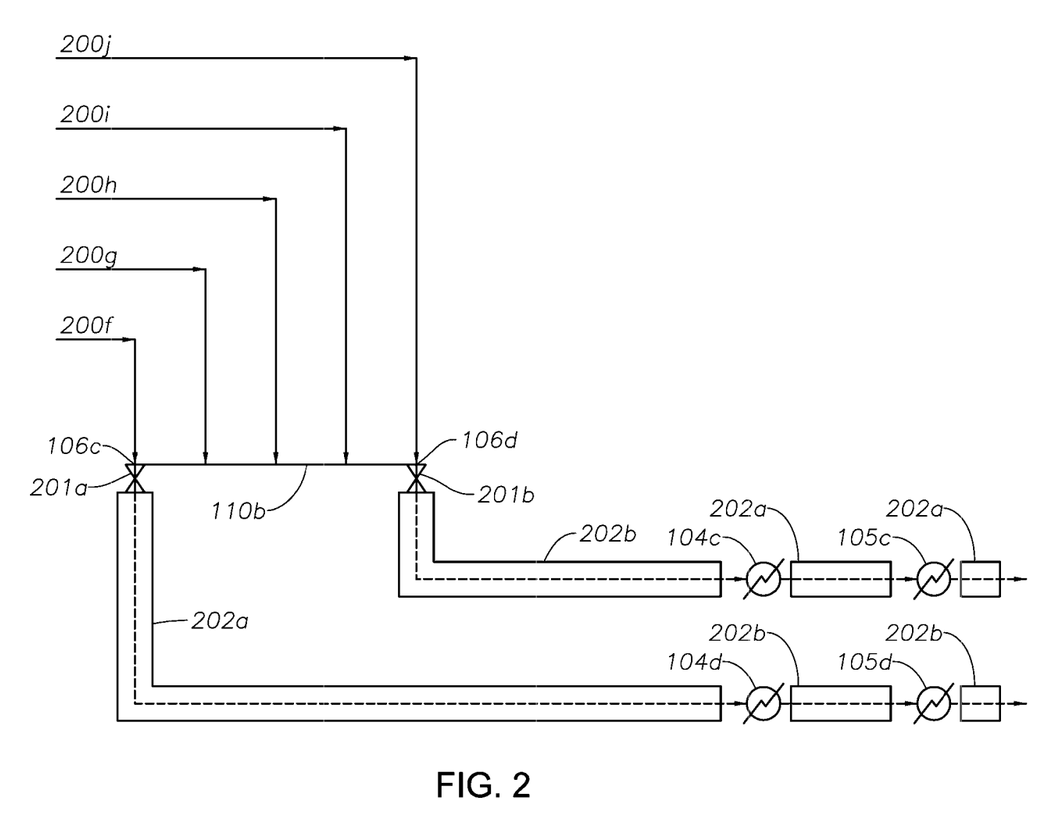
FIG. 2 shows schematically the detail of intercooler cooling jackets for the secondary compressor interstage according to an embodiment of the invention.

FIG. 2 shows additional detail of the intercooler cooling jackets for two of the intercoolers 104c-d from FIG. 1. Process streams 200f-j in FIG. 2 correspond to the discharge streams from cylinders 102*f-j* in FIG. 1. Process streams 200*f-j* flow through the first stage discharge cross-connect pipe 110*b*, and exit through discharge valves 201*a-b*. The interstage cooling jackets 202*a-b* start immediately downstream of the discharge valves 201*a-b* located just downstream of the first stage discharge pipe cross-connects 106*c-d* and end immediately upstream of the second stage suction pipe cross-connects (not shown in FIG. 2). The piping arrangement for the secondary compressor should enable the pipes to be easily dismantled and cleaned. Additionally, the piping should not have dead ends or sections where stagnant gas might build up. These dead ends in the piping at high pressure can accumulate polymer deposits. Long radius elbows in the piping may mitigate this possibility and facilitate easy dismantling of the piping. A long radius elbow is defined herein as an elbow having a bend radius that is at least 10 times or more greater than the outer diameter of the pipe. In embodiments of the invention, the piping within the secondary compressor comprises at least one long radius elbow. For example, the piping within the secondary compressor may comprise at least 2, 4, 8, 12, 16, 20, 24, 28, 32, 36, or 40 or more long radius elbows. Additionally, the piping within a given stage of the secondary compressor, such as the first stage, the second stage, or the interstage, may comprise at least 2, 4, 8, 12, 16, 20, 24, 28, 32, 36, or 40 or more long radius elbows.

Process for Producing Ethylene Polymer

Figure 3:
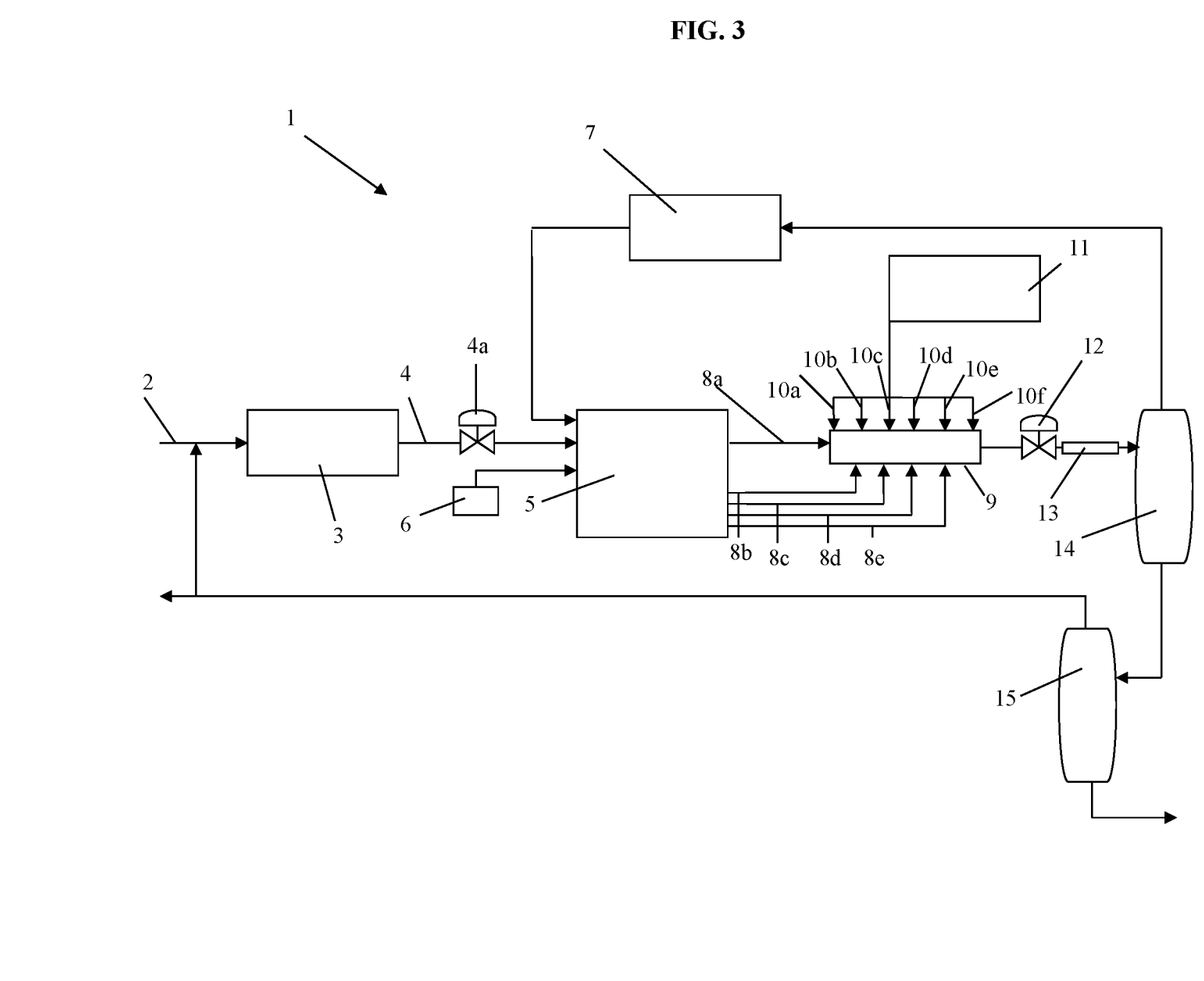
FIG. 3 shows schematically an ethylene polymerization plant or apparatus according to an embodiment of the invention.

The present invention may be better understood with reference to the following description of a high pressure polyethylene process according to embodiments of the invention. FIG. 3 is a schematic of a polymerization plant 1 including an ethylene feed line 2 which supplies fresh ethylene to a primary compressor 3. The function of the primary compressor is to pressurize fresh ethylene (make-up ethylene) to the pressure of the ethylene recycle system, for feed to the secondary compressor. The primary compressor may be a single compressor, that alone pressurizes the ethylene to the pressure of the recycle stream, or it may be two or more compressors in series or in parallel that, in combination, pressurize the fresh ethylene to the pressure of the ethylene recycle system. In some existing ethylene reactor plants, the ethylene discharged from the primary compressor is divided into two streams, one stream being combined with recycled ethylene and fed to the suction of the secondary compressor, and the other stream being injected into the ethylene/polymer mixture downstream of the high-pressure, let-down valve, thereby providing rapid cooling of the ethylene/polymer mixture prior to entry into the product separation unit.

The ethylene discharged from the primary compressor 3 flows via conduit 4 having a valve 4*a* to the secondary compressor 5. Also entering the secondary compressor 5 is a stream of fresh modifier(s) and/or optional comonomer(s) and a stream of recycled ethylene. The fresh modifier stream is supplied by a separate modifier pump 6. The recycled ethylene comes from the high pressure recycle system 7. The secondary compressor compresses the ethylene to the pressure necessary for supply to the reactor. The secondary compressor is preferably a unit driven by a single motor, but may alternatively comprise two or more compressors in series or in parallel driven by separate motors. The secondary compressor may comprise 2, 4, 6, 8, or 10 or more cylinders in the first stage, and 2, 4, 6, 8, or 10 or more cylinders in the second stage. Any configuration of compressors, including the configuration described in greater detail below, is intended to be within the scope of this disclosure as long as said configuration is adapted to compress the ethylene from the intermediate pressure of the ethylene as it leaves the primary compressor to the desired reactor pressure.

The secondary compressor 5 discharges compressed ethylene in five streams 8*a*, 8*b*, 8*c*, 8*d*, and 8*e*. In embodiments of the invention, stream 8*a* accounts for about 20%, about 33%, or about 50% of the total ethylene flow. Stream 8*a* is heated by a steam jacket (not shown) which heats the ethylene, prior to entry into the front end of the tubular reactor 9. The four remaining ethylene side streams 8*b*, 8*c*, 8*d*, and 8*e* each enter the reactor as side streams. Side streams 8*b*, 8*c*, 8*d*, and 8*e* are cooled. The tubular reactor 9 is also shown with six initiator inlets 10*a* to 10*f* which are spaced at intervals along reactor 9 and are fed from an initiator mixing and pumping station 11. The number of initiator inlets may vary from 4 to 7, but is typically at least 1. The first initiator injection point 10*a* is just downstream of the front end of the reactor 9 and defines the start of the first reaction zone. Initiator entering through that first initiator inlet 10*a* combines with the hot ethylene from stream 8*a* and polymerization begins, raising the temperature of the ethylene as it travels down tubular reactor 9. A heating/cooling jacket (not shown) fitted on reactor 9 cools the reaction mixture and the temperature of the reaction mixture peaks at between 210 and 350° C., as initiator is consumed and the rate of polymerization begins to fall, and then begins to decline. Entry of the first side stream 8*b* cools the reaction mixture further. The second initiator injection inlet 10*b* is just downstream of the entry point of side stream 8*b* and defines the start of the second reaction zone. Once again, the temperature of the reaction mixture rises, peaks and falls as it flows along the tubular reactor 9 with the entry of the second side stream 8*c* providing a further rapid cooling prior to entry of initiator at the third initiator inlet 10*c*, which defines the start of the third reaction zone. The third, fourth, fifth and sixth reaction zones are similar to the second reaction zone except that the side streams are optional with regard to the fifth and sixth reaction zones, and therefore the distance between the fifth and sixth initiator inlets 10*e* and 10*f* may be relatively long, in order to allow for a greater length of heating/cooling jacket. Downstream of the sixth initiator inlet 10*f* and the sixth reaction zone, the tubular reactor terminates in a high-pressure, let-down valve 12.

In the region upstream of the injection point of the first side stream 8*b*, the tubular reactor 9 has an initial internal diameter, which increases downstream of side stream 8*b*, and increases further downstream of each subsequent side stream until a maximum internal diameter of at least 65 mm, and preferably at least 70 mm is reached in the region downstream of the final side stream 8*e*. That internal diameter profile allows the flow rate throughout the tubular reactor 9 to be maintained at about 15 m/s during normal operation under a secondary compressor throughput of 160 tonnes/hour and at an acceptable pressure drop across the reactor.

The high-pressure, let-down valve 12 controls the pressure in the tubular reactor 9. Immediately downstream of the high-pressure, let-down valve 12 is product cooler 13. Upon entry to the product cooler 13, the reaction mixture is in a phase separated state. It exits into high pressure separator 14. The overhead gas from the high pressure separator 14 flows into the high pressure recycle system 7 where the unreacted ethylene is cooled and returned to the secondary compressor 5.

The polymer product flows from the bottom of the high pressure separator 14 into the low pressure separator 15, separating almost all of the remaining ethylene from the polymer. That remaining ethylene is transferred either to a flare (not shown) or a purification unit (not shown) or is recycled via the primary compressor 3 from the product separator unit to the secondary compressor. Molten polymer flows from the bottom of the low pressure separator 15 to an extruder (not shown) for extrusion, cooling and pelletizing.

The proportion of the total ethylene which enters the reactor 9, whether in the main feed stream 8a or as a side stream 8b, 8c, 8d, or 8e which is converted to polymer before exiting the reactor 9 is referred to as the conversion. In an embodiment of the invention, the conversion may be from 30% to 40% and alternatively at least 35%. Conversions of higher than 40% are feasible but are not preferred, partly because the viscosity of the reaction mixture increases with its polymer content, which leads in turn to an increase in the pressure drop required to maintain the necessary flow velocity. The ethylene polymer product manufactured according to the invention may have a density of from 0.910 to 0.930 g/cm$^3$ (as measured by ASTM D1505) and a melt index of from 0.1 to 20 dg/min (as measured by ASTM D1238). For example, the ethylene polymer obtained from the process according to the invention may have a density of from 0.915 to 0.920 g/cm$^3$ and a melt index of from 2 to 6 dg/min.

The processes herein may be used for the manufacture of ethylene homopolymers and copolymers, such as ethylene-vinyl acetate copolymers. Typically the comonomer(s) will be pressurized and injected into the secondary compressor at one or more points. Other possible comonomers include propylene, 1-butene, iso-butene, 1-hexene, 1-octene, other lower alpha-olefins, methacrylic acid, methyl acrylate, acrylic acid, ethyl acrylate and n-butyl acrylate. Reference herein to "ethylene" should be understood to include ethylene and comonomer mixtures, except where another meaning is implied by context.

Initiators

The term "initiator" as used herein refers to a compound that initiates the free radical ethylene polymerization process. Suitable initiators for use in the present invention include, but are not limited to, organic peroxide initiators. Peroxides are, for example, pure peroxide. Further examples of suitable initiators include peresters including, but not limited to, bis(2 ethylhexyl)peroxydicarbonate, tert-Butyl per(2-ethyl)hexanoate, tert-Butyl perpivalate, tert-Butyl perneodecanoate, tert-Butyl perisobutyrate, tert-Butyl per-3,5, 5,-trimethylhexanoate, tert-Butyl perbenzoate, and dialkyl peroxides including, but not limited to, di-tert-butyl peroxide, and mixtures thereof.

The pure peroxides are mixed, typically in a hydrocarbon solvent, and are then injected into the reactor at the injection locations as described herein. Any suitable pump may be used, for example, a hydraulically driven piston pump.

The inventive process may advantageously use from 0.3 kg to 1.5 kg of initiator per tonne of polyethylene polymer produced, and less than 0.7 kg of initiator per tonne of polyethylene.

Modifier

The term "modifier" as used herein refers to a compound added to the process to control the molecular weight and/or melt index of a produced polymer. The term "chain transfer agent" is interchangeable with the term "modifier" as used herein. The modifier may be at least one of tetramethylsilane, cyclopropane, sulfur hexafluoride, methane, t-butanol, perfluoropropane, deuterobenzene, ethane, ethylene oxide, 2,2-dimethylpropane, benzene, dimethyl sulfoxide, vinyl methyl ether, methanol, propane, 2-methyl-3-buten-2-ol, methyl acetate, t-butyl acetate, methyl formate, ethyl acetate, butane, triphenylphosphine, methylamine, methyl benzoate, ethyl benzoate, N,N-diisopropylacetamide, 2,2,4-trimethylpentane, n-hexane, isobutane, dimethoxymethane, ethanol, n-heptane, n-butyl acetate, cyclohexane, methylcyclohexane, 1,2-dichloroethane, acetronitrile, N-ethylacetamide, propylene, n-decane, N,N-diethylacetamide, cyclopentane, acetic anhydride, n-tridecane, n-butyl benzoate, isopropanol, toluene, hydrogen, acetone, 4,4-dimethylpentene-1, trimethylamine, N,N-dimethylacetamide, isobutylene, n-butyl isocyanate, methyl butyrate, n-butylamine, N,N-dimethylformamide, diethyl sulfide, diisobutylene, tetrahydrofuran, 4-methylpentene-1, p-xylene, p-dioxane, trimethylamine, butene-2, 1-bromo-2-chlorethane, octene-1, 2-methylbutene-2, cumene, butene-1, methyl vinyl sulfide, n-butyronitrile, 2-methylbutene-1, ethylbenzene, n-hexadecene, 2-butanone, n-butyl isothiocyanate, methyl 3-cyanopropionate, tri-n-butylamine, 3-methyl-2-butanone, isobutyronitrile, di-n-butylamine, methyl chloroacetate, 3-methylbutene-1, 1,2-dibromoethane, dimethylamine, benzaldehyde, chloroform, 2-ethylhexene-1, propionaldehyde, 1,4 dichlorobutene-2, tri-n-butylphosphine, dimethylphosphine, methyl cyanoacetate, carbon tetrachloride, bromotrichloromethane, di-n-butylphosphine, acetaldehyde, phosphine, and mixtures thereof. Typically, the modifier is an aldehyde including acetaldehyde, propionaldehyde, butyraldehyde, and mixtures thereof. In an embodiment of the invention, the modifier may be present in the invention in the amount of up to 5 kg per tonne of polyethylene, or from 0.5 to 5 kg per tonne of polyethylene, or from 1 to 5 kg per tonne of polyethylene, or from 2 to 5 kg per tonne of polyethylene, or from 3 to 5 kg per tonne of polyethylene, or from 4 to 5 kg per tonne of polyethylene.

For further details of modifiers, see Advances in Polymer Science, Vol. 7, pp. 386-448, (1970). Table 7 therein ranks several chain transfer agents in order of the chain transfer constant determined under set conditions. Aldehydes, including propionaldehyde and acetaldehyde, are known to have favorably higher chain transfer constants, compared to other chain transfer agents such as propane, butane, isobutane, propene, isobutene, and 1-butene.

The modifier may comprise a $C_2$ to $C_{20}$ or a $C_2$ to $C_{12}$ aldehyde. The modifier may also comprise a $C_2$ to $C_{20}$ or a $C_2$ to $C_{12}$ saturated modifier. Additionally, the modifier may comprise a $C_2$ to $C_{20}$ or a $C_2$ to $C_{12}$ unsaturated modifier.

The modifier can be added into the reaction mixture in one or more of three separate locations. In an embodiment, the modifier may be injected along with the initiator into the reactor, thereby reducing the amount of initiator required for the process resulting in monetary savings as initiators are generally costly. In another embodiment, the modifier may be injected in the discharge of the secondary (high pressure) compressor. In yet another embodiment, the modifier may be injected in the suction of the second stage of the secondary compressor.

EXAMPLES

The effects of discharge temperature and modifier type and concentration on fouling were evaluated in a commercial scale high pressure polyethylene tubular reactor system similar to the system described above and illustrated in FIG. 3. The reactor system comprised a primary compressor and a secondary compressor, the secondary compressor having a first stage and a second stage. The operating discharge temperature of both the first and second stages of the secondary compressor and the type of modifier used were varied and observations were noted, as discussed further below.

In the first set of observations, an unsaturated monomer modifier comprising a mixture of propylene and butene was used. The first stage discharge temperature was substantially maintained at below 95° C. Two different modifier concentrations were evaluated in two lines operating at similar process conditions. The total concentration of unsaturated monomer modifier within the first line was maintained at a minimum concentration of 0.1 mol % or more, and it was observed that mechanical cleaning of the first stage piping (via pigging) was only required approximately every 4 years. The total concentration of unsaturated monomer modifier within the second line was maintained below 0.1 mol %, and it was observed that thermal polymerization fouling in the first stage piping increased and mechanical cleaning was required approximately every 2 years. The second stage discharge temperature was substantially maintained at below 70° C., and no fouling within the second stage was observed.

In the second set of observations, propionaldehyde was used as the modifier at varying concentrations of from about 0 to 10 wt % based on the weight of the process stream, and the first stage discharge temperature was varied. At a first stage discharge temperature of 80 to 85° C., it was observed that mechanical cleaning was required at intervals of greater than 2 years. When the first stage discharge temperature was increased to 90° C., mechanical cleaning was required approximately every 1 year. When the first stage discharge temperature was increased to 95° C., mechanical cleaning was required approximately every 4 to 6 months. At a first stage discharge temperature of 100° C., mechanical cleaning was required approximately every 3 months.

Certain embodiments and features have been described using a set of numerical upper limits and a set of numerical lower limits. It should be appreciated that ranges from any lower limit to any upper limit are contemplated unless otherwise indicated. Certain lower limits, upper limits, and ranges appear in one or more claims below. All numerical values are "about" or "approximately" the indicated value, and take into account experimental error and variations that would be expected by a person having ordinary skill in the art.

To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A high pressure polyethylene polymerization system comprising a reactor, a primary compressor, and a secondary compressor, the secondary compressor comprising:
    a. a first stage, wherein the first stage comprises at least two cylinders, and the discharge pipes of the at least two cylinders are fluidly connected by a first stage discharge cross-connect pipe;
    b. a second stage;
    c. an interstage; and
    d. a first cooler applied to the interstage piping at a location within 10 meters downstream of the first stage discharge pipe cross-connect.

2. The system of claim 1, wherein the first stage comprises at least four cylinders, and the discharge pipes of the at least four cylinders are fluidly connected by a first stage discharge pipe cross-connect.

3. The system of claim 1, wherein the first cooler is applied at a location immediately downstream of the first stage discharge pipe cross-connect.

4. The system of claim 1, wherein the first cooler is a cooling jacket or a heat exchanger.

5. The system of claim 1, wherein the second stage comprises at least two cylinders, and the suction pipes of the at least two cylinders are fluidly connected by a second stage suction cross-connect pipe.

6. The system of claim 1, wherein the second stage comprises at least four cylinders, and the suction pipes of the at least four cylinders are fluidly connected by a second stage suction cross-connect pipe.

7. The system of claim 5, wherein the first cooler is a cooling jacket and the cooling jacket ends at a location within 10 meters upstream of the second stage suction pipe cross-connect.

8. The system of claim 5, wherein the first cooler is a cooling jacket and the cooling jacket ends at a location immediately upstream of the second stage suction pipe cross-connect.

9. The system of claim 1, wherein the second stage comprises at least two cylinders, and the discharge pipes of the at least two cylinders in the second stage are fluidly connected by a second stage discharge cross-connect pipe.

10. The system of claim 1, wherein the second stage comprises at least four cylinders, and the discharge pipes of the at least four cylinders are fluidly connected by a second stage discharge cross-connect pipe.

11. The system of claim 9, wherein a second cooler is applied to the interstage piping at a location within 10 meters downstream of the second stage discharge pipe cross-connect.

12. The system of claim 9, wherein a second cooler is applied to the interstage piping at a location immediately downstream of the second stage discharge pipe cross-connect.

13. The system of claim 11, wherein the second cooler is a cooling jacket or a heat exchanger.

14. The system of claim 11, wherein the second cooler is a cooling jacket and the cooling jacket ends at a location within 10 meters upstream of an entrance to the reactor.

15. The system of claim 11, wherein the second cooler is a cooling jacket and the cooling jacket ends at a location immediately upstream of an entrance to the reactor.

16. A high pressure polyethylene polymerization process comprising:
    a. providing a feed stream comprising ethylene;
    b. compressing the feed stream in a primary compressor;
    c. further compressing the feed stream in a secondary compressor, wherein the secondary compressor comprises a first stage and a second stage, and wherein the first stage and second stage each comprise at least two cylinders and discharge pipes, and the discharge pipes of the at least two cylinders of the first stage are fluidly connected by a first stage discharge cross-connect pipe;

d. cooling the compressed feed stream at a location within 10 meters downstream of the first stage discharge cross-connect pipe; and e. feeding the compressed feed stream to a polymerization reactor.

17. The polymerization process of claim 16, wherein an operating discharge temperature of the first stage cylinders is substantially maintained at or below 85° C. and an operating discharge temperature of the second stage cylinders is substantially maintained at or below 60° C.

18. The polymerization process of claim 16, wherein an operating discharge temperature of the first stage cylinders is substantially maintained at or below 95° C. and an operating discharge temperature of the second stage cylinders is substantially maintained at or below 80° C.

19. The polymerization process of claim 16, wherein no modifier is added to polymerization process.

20. The polymerization process of claim 16, wherein a modifier is added to polymerization process.

21. The polymerization process of claim 20, wherein the modifier is an aldehyde.

22. The polymerization process of claim 20, wherein the modifier is selected from the group consisting of at least one of acetaldehyde, propionaldehyde, butyraldehyde, and mixtures thereof.

23. The polymerization process of claim 20, wherein the modifier is a $C_2$ to $C_{20}$ unsaturated modifier.

24. The polymerization process of claim 20, wherein the modifier is a $C_2$ to $C_{20}$ saturated modifier.

25. The polymerization process of claim 20, wherein the modifier concentration in a process stream within the secondary compressor is maintained at or greater than 0.1 mole %, based on the total moles of the process stream.

* * * * *